United States Patent [19]
Shimizu et al.

[11] Patent Number: 5,832,324
[45] Date of Patent: Nov. 3, 1998

[54] POWER SUPPLY UNIT OF CAMERA

[75] Inventors: Saori Shimizu, Hachioji; Katsutoshi Nishiuchi, Hino, both of Japan

[73] Assignee: Olympus Optical Co., Ltd., Tokyo, Japan

[21] Appl. No.: 979,601

[22] Filed: Nov. 26, 1997

[30] Foreign Application Priority Data

Dec. 3, 1996 [JP] Japan .................................. 8-322965

[51] Int. Cl.$^6$ ...................................................... G03B 7/26
[52] U.S. Cl. .......................... 396/303; 396/106; 396/129
[58] Field of Search ..................................... 396/303, 301, 396/302, 129, 106, 206

[56] References Cited

U.S. PATENT DOCUMENTS

| | | | |
|---|---|---|---|
| 5,327,070 | 7/1994 | Seki et al. ................................ | 396/129 |
| 5,365,305 | 11/1994 | Seki et al. ................................ | 396/301 |
| 5,727,241 | 3/1998 | Yamano et al. ...................... | 396/303 X |
| 5,737,651 | 4/1998 | Hibino et al. ............................ | 396/303 |

FOREIGN PATENT DOCUMENTS 2-232639  9/1990  Japan .

OTHER PUBLICATIONS

English language Abstract of Jap. 2–232639; Sep. 1990.

*Primary Examiner*—W. B. Perkey
*Attorney, Agent, or Firm*—Frishauf, Holtz, Goodman, Langer & Chick

[57] ABSTRACT

The present invention provides a power supply unit of a camera which efficiently drives a heavy-load system even when a power supply voltage is low and thus drives a heavy-load circuit in a short time in the photographing sequence of the camera without any trouble. The power supply unit includes a charging section for charging a capacitor with a boosted DC power supply voltage, a switching section which receives the output voltage of the charging section and the DC power supply voltage and selectively applies one of these voltages to the heavy-load circuit, and a control section for controlling operations of the switching section and the charging section. The control section controls the switching section such that the output voltage of the charging section is output in the early stage of a time period during which the power supply voltage is being applied to the heavy-load circuit and then the DC power supply voltage is output. The control section also controls the charging section such that the DC power supply voltage is boosted while the DC power supply voltage is being applied to a load.

27 Claims, 13 Drawing Sheets

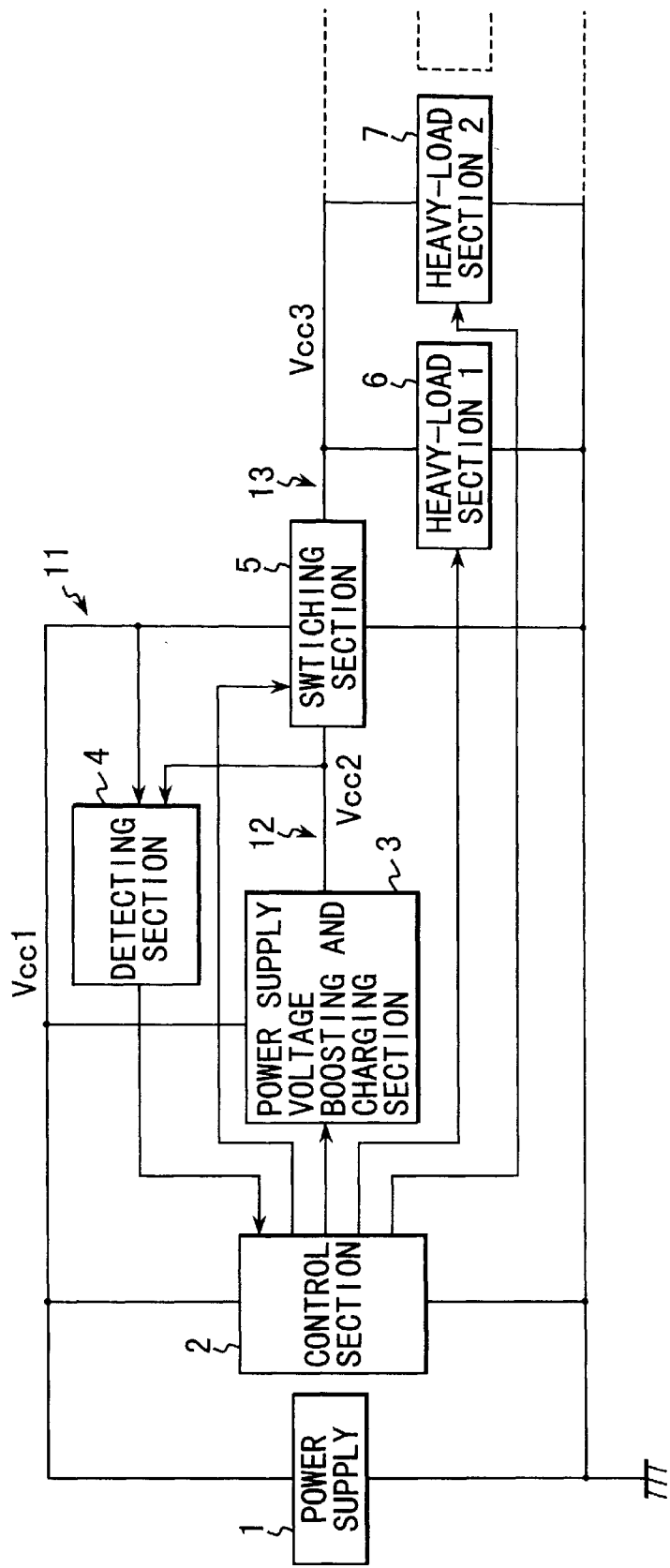
F I G. 1

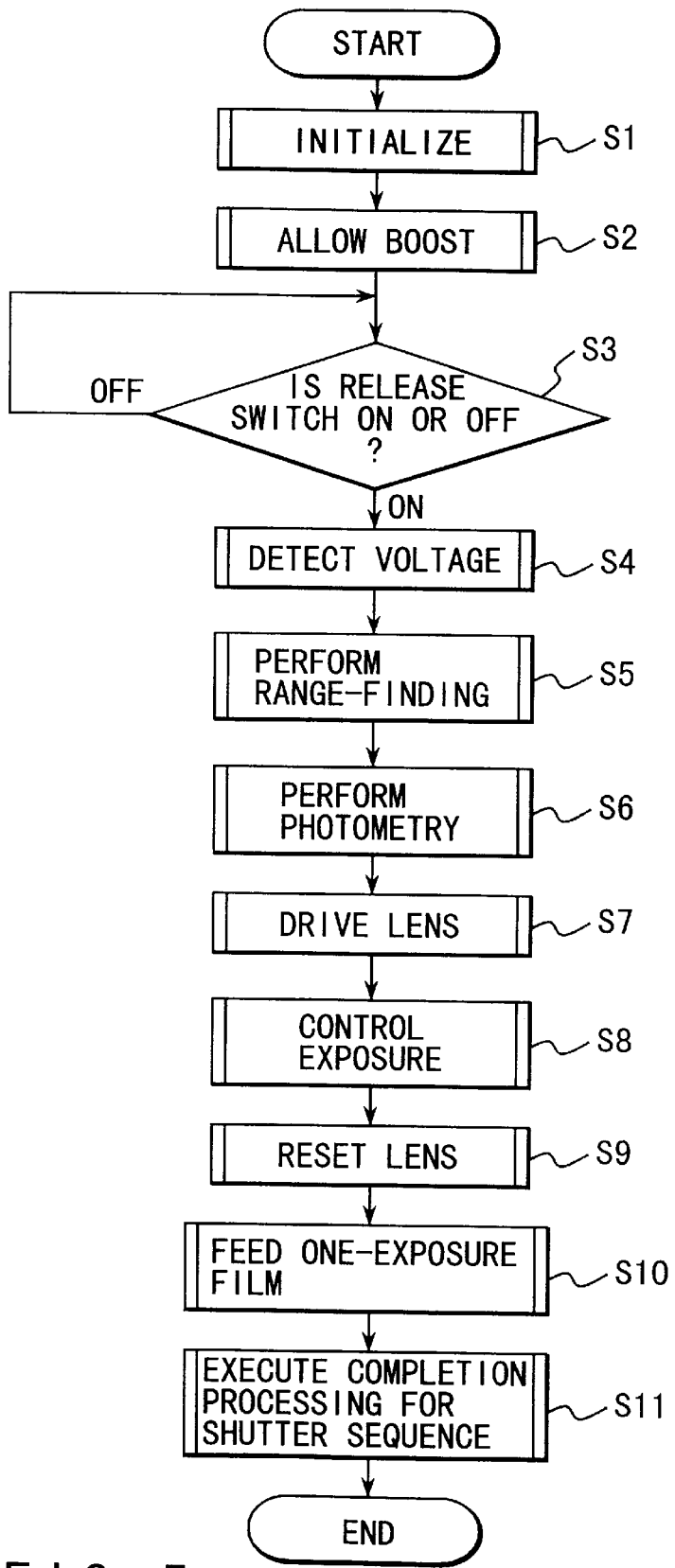
F I G. 5

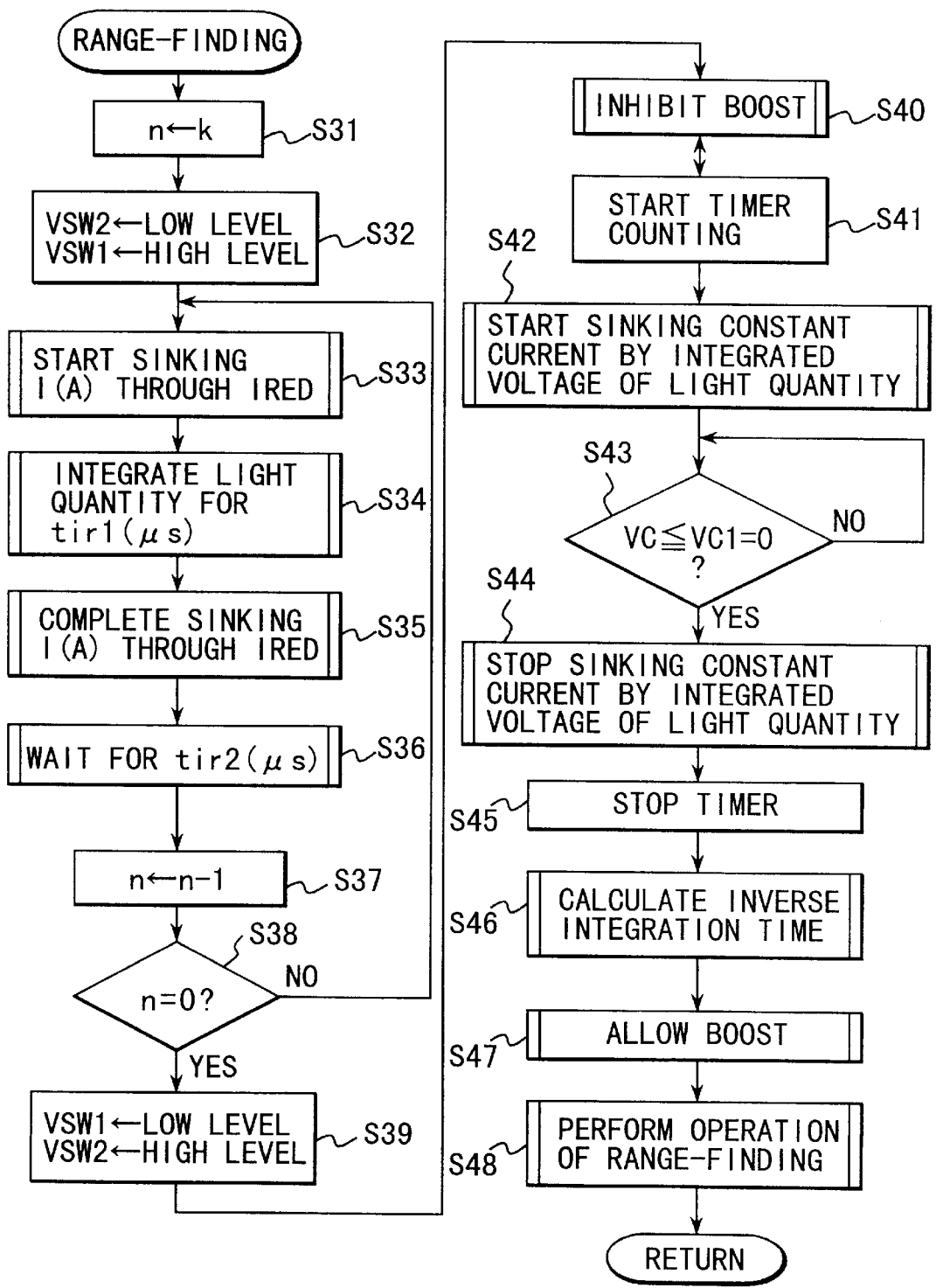
F I G. 7

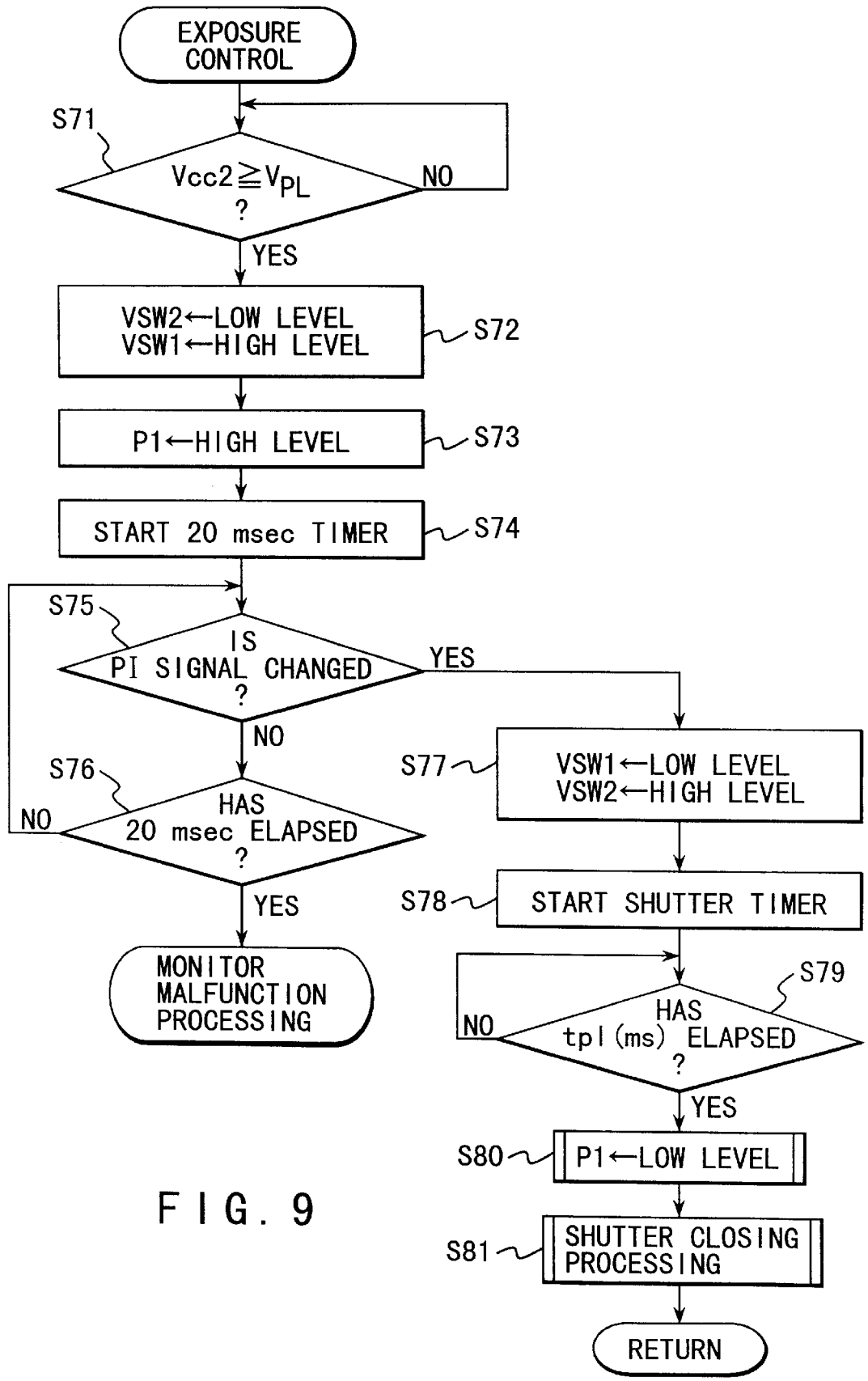
F I G. 9

POWER SUPPLY UNIT OF CAMERA

BACKGROUND OF THE INVENTION

The present invention relates to a power supply unit of a camera which is capable of efficiently driving a heavy-load system of an actuator or the like even when a power supply voltage is low.

Conventionally, it has been desired that an image-pickup device such as a camera of a precision instrument be operated at a low voltage. The problem of achieving such a camera is how to drive a heavy-load circuit consuming a large amount of current and requiring a certain amount of power supply voltage, for example, an actuator such as a motor and a plunger and an IRED (Infra Red Emitting Diode) necessary for active range-finding.

The IRED necessitates about 2.5 V as a voltage between the anode and cathode at the time of emission. When the power supply voltage is lower than about 2.5 V, infrared rays cannot be emitted directly from the IRED by the power supply voltage; therefore, the IRED cannot be driven by means of one battery of, e.g., 1.5 V.

A certain amount of voltage and a large amount of current of 1 A are required when the actuator is initially driven or started. When the power supply voltage is about 1 V, for example, it is difficult to start the actuator directly by the power supply voltage. The voltage necessary for starting the actuator varies from load to load and from type to type and, for example, a voltage of 2 V is required.

In view of the above, Jpn. Pat. Appln. KOKAI Publication No. 2-232639 discloses a technique of driving one actuator using a boosted voltage with which one capacitor is charged. According to this technique, when a great load is applied to a development roller and high torque is required for a motor, the discharge current of the capacitor charged with a voltage higher than that of a built-in battery, is supplied to the motor. The built-in battery is thus reduced in load and decreased in size.

Generally, in cameras, there is a case where one actuator is used intermittently, i.e., a single motor is used to wind or rewind a film and drive a mirror and a case where a plurality of actuators are used, i.e., different motors are used to wind or rewind a film and drive a lens. A heavy-load circuit of these actuators has to be operated in a short time in a photographing sequence.

In the prior art, however, the driving of a plurality of motors was not taken into consideration to meet the above requirements. Furthermore, in order to control a plurality of actuators so as not to cause any problem in operations of a camera in a general photographing sequence, the measures of using a plurality of capacitors, increasing a boosted voltage charging the capacitors, decreasing the boost time, increasing the capacity of the capacitors, etc., can be taken but are often difficult in practical use. The heavy-load system other than the actuators, e.g., the IRED necessary for active range-finding has to be driven by any method.

BRIEF SUMMARY OF THE INVENTION

The present invention has been developed in consideration of the above problems and its object is to provide a power supply unit of a camera which efficiently drives a heavy-load system even when a power supply voltage is low and thus drives a heavy-load circuit in a short time in the photographing sequence without any trouble and which is simple in constitution and advantageous in mounting.

In order to achieve the object, according to a first aspect of the present invention, there is provided a power supply unit of a camera comprising:

DC power supply voltage boosting means having a capacitor, for boosting a DC power supply voltage and charging the capacitor with a boosted voltage;

switching means which receives both an output voltage of the DC power supply voltage boosting means and the DC power supply voltage and selectively outputs one of the output voltage and the DC power supply voltage to a plurality of load circuits; and control means for controlling operations of the switching means and the DC power supply voltage boosting means, the operation of the switching means being controlled in accordance with an operating condition of the plurality of load circuits.

According to a second aspect of the present invention, there is provided a power supply unit of a camera comprising:

a DC power supply voltage boosting circuit having a capacitor, for boosting a DC power supply voltage and charging the capacitor with a boosted voltage;

a switching circuit which receives both an output voltage of the DC power supply voltage boosting means and the DC power supply voltage and selectively outputs one of the output voltage and the DC power supply voltage to a plurality of load circuits;

a voltage detection circuit for detecting the DC power supply voltage and the output voltage of the DC power supply voltage boosting means; and a control circuit for controlling an operation of the switching circuit in response to an output signal of the voltage detection circuit.

According to a third aspect of the present invention, there is provided an electric circuit of a camera comprising:

a charging section for boosting a power supply voltage and charging a capacitor with a boosted power supply voltage; and a switching section for selectively applying the power supply voltage and an output voltage of the charging section to a plurality of load circuits.

According to a fourth aspect of the present invention, there is provided an electric circuit of a camera comprising:

a charging section having a capacitor, for boosting a power supply voltage and charging the capacitor with a boosted power supply voltage;

an actuator driving section for driving an actuator;

a switching section for selectively applying the power supply voltage and an output voltage of the charging section to the actuator driving section;

a detection section for detecting the power supply voltage and the output voltage of the charging section; and a control section for varying a switching sequence of the switching section based on a detection result of the detection section.

According to a fifth aspect of the present invention, there is provided an electric circuit of a camera comprising:

a charging section having a capacitor, for boosting a power supply voltage and charging the capacitor with a boosted power supply voltage;

an actuator driving section for driving an actuator;

a switching section for selectively applying the power supply voltage and an output voltage of the charging section to the actuator driving section; and a control section controls a switching sequence of the switching section to switch between the power supply voltage and the output voltage of the charging section when the actuator is driven and to charge the charging section with a boosted voltage when the power supply voltage is applied to the actuator driving section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate a presently preferred embodiment of the invention and, together with the general description given and the detailed description of the preferred embodiment given below, serve to explain the principles of the invention.

FIG. 1 is a block diagram illustrating a constitution of a power supply unit of a camera according to an embodiment of the present invention;

FIG. 5 is a main flowchart for explaining an operation of the power supply unit of FIG. 1;

FIG. 7 is a flowchart showing a sequence of a subroutine of "range-finding";

FIG. 9 is a flowchart showing a sequence of a subroutine of "exposure control";

DETAILED DESCRIPTION OF THE INVENTION

Figure 2:
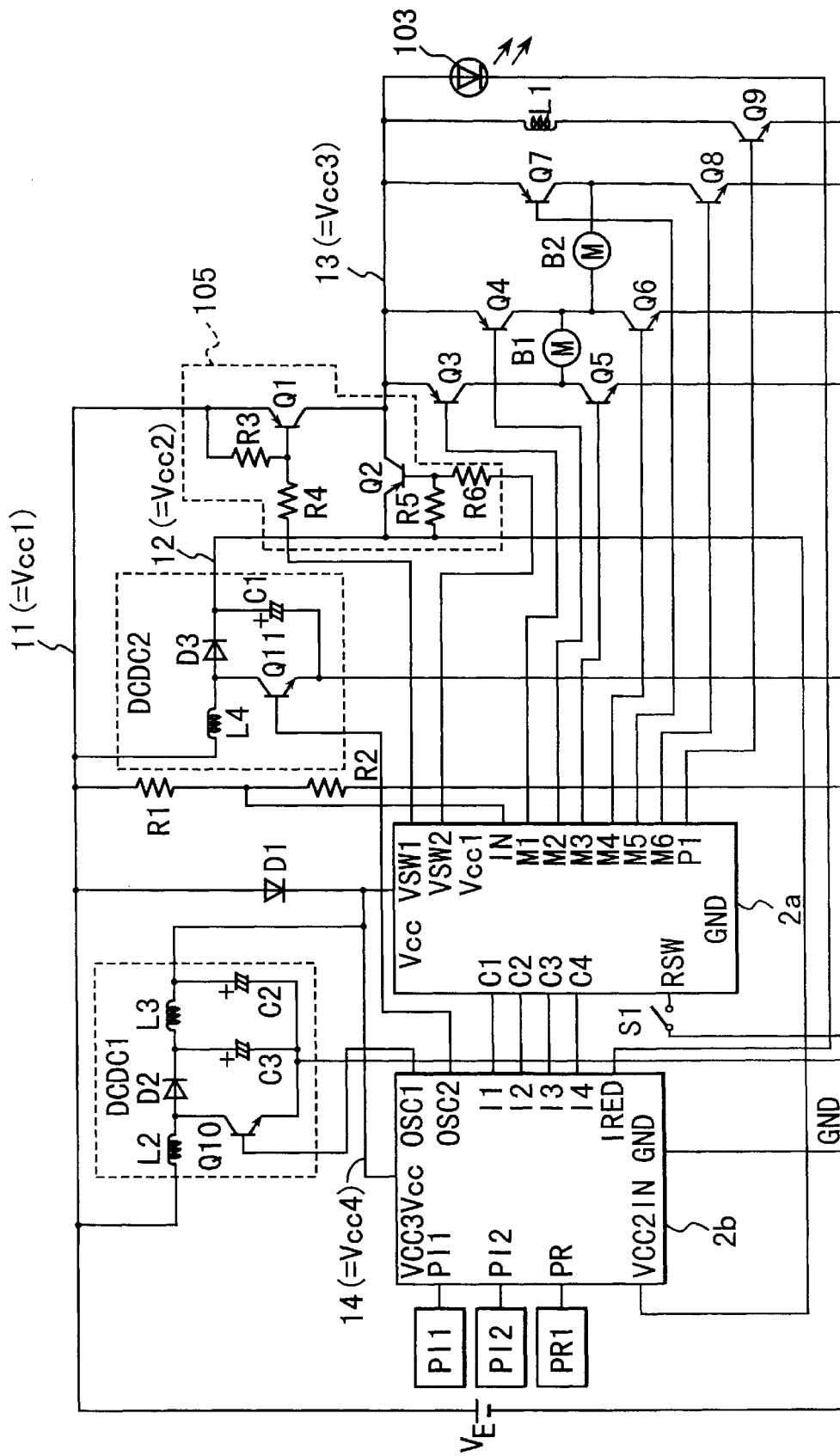
FIG. 2 is a circuit diagram embodying the constitution of the power supply unit shown in FIG. 1.

An embodiment of the present invention will now be described with reference to the accompanying drawings.

FIG. 1 is a block diagram illustrating a constitution of a power supply unit of a camera according to an embodiment of the present invention.

The power supply unit includes a power supply 1 such as a battery, which supplies a current to each of circuits in the camera. It is a power supply line 11 that is directly connected to the power supply 1. Assume that the voltage of the line 11 is VCC1. A control section 2 is connected to the power supply 1 and includes a CPU and a control IC to control the circuits of the camera. A power supply voltage boosting and charging section 3 is also connected to the power supply 1.

The power supply voltage boosting and charging section 3 includes a booster circuit and a capacitor. The booster circuit boosts a power supply voltage of the power supply 1 and the capacitor is charged with the boosted voltage. Assume that the voltage of a power supply line 12 is VCC2 which is higher than that of the power supply 1. The voltage VCC2 is set higher than a voltage capable of driving at least an IRED.

The lines 11 and 12 are both connected to a switching section 5. The section 5 is controlled by the control section 2 and selectively supplies one of voltages VCC1 and VCC2 to a power supply line 13. The lines 11 and 12 are also connected to a detecting section 4 by which the voltages VCC1 and VCC2 are monitored. The voltage detected by the detecting section 4 is applied to the control section 2, and the control sequence of the switching section 5 is varied such that the control section 2 applies an adequate voltage to heavy-load sections 6, 7, . . . based on the voltage detected by the section 4.

The heavy-load sections 6, 7, . . . are, for example, an actuator such as a motor and a plunger, an autofocus IRED, and circuits for driving these and arranged in parallel to one another. All the driving circuits are connected in common to the power supply line 13. Assume that the voltage of the line 13 is VCC3.

With the foregoing constitution of the power supply unit, the actuator and IRED can be driven by a single boost power supply and, in other words, they can be driven by charges of one capacitor of the power supply voltage boosting and charging section 3. Since, as described above, the voltages VCC1 and VCC2 are monitored by the detecting section 4 and the control section 2 changes a switching sequence of the switching section 5, the charges of the battery and capacitor can be used with efficiency.

Furthermore, the voltage VCC3 of the power supply line 13, which is applied to the driving circuits of the heavy-load sections 6, 7, . . ., is switched to VCC2 at which initial driving time (the starting time) the load of the actuator is high, while the voltage VCC 3 is switched to VCC1 at which constant driving time the load is relatively low, and the actuator is charged with VCC2 while it is being driven at VCC1. It is thus possible to efficiently charge the actuator with VCC2 within a limited shutter-sequence time.

FIG. 2 is a circuit diagram embodying the constitution of the power supply unit shown in FIG. 1.

In FIG. 2, VE indicates a battery corresponding to the power supply 1 of FIG. 1. In the embodiment, it is assumed that the voltage of the battery (e.g., 1.5 V of an AA-size battery), which is capable of starting the motor and plunger when it is a brand-new one, is decreased to a voltage (e.g., 0.9 V) incapable of starting them, and the battery is incapable of driving the IRED even when it is a new one. In this case, too, assume that the voltage of the power supply line 11 directly connected to the power supply 1 is VCC1.

A CPU 2a has an A/D converter (not shown) and controls the respective circuits. S1 denotes a lens reset switch connected to the CPU 2a. The switch S1 is mechanically turned on when a lens (not shown) is in a reset position and turned off when it is not. When the lens moves from the reset position, the switch S1 changes from ON-state to OFF-state, thereby detecting a position of the lens.

A control IC 2b as well as the CPU 2a corresponds to the control section 2 of FIG. 1, and is controlled by the CPU 2a to control and boost each of the circuits. Photo-interrupters PI1 and PI2 and a photo-reflector PR1 are connected to the control IC 2b. The photo-interrupter PI1 monitors an operation of a lens driving motor and issues a pulse signal according to an amount of operation of the motor in operation, while the photo-interrupter PI2 monitors an operation of shutter blades and produces a signal in association with the opening of the shutter blades. The photo-reflector PR1 detects movement of films in a film feeding mechanism and issues a pulse signal in association with perforation of the films. The signals of PI1, PI2 and PR1 are transmitted to the CPU 2a through the control IC 2b.

In FIG. 2, DCDC1 and DCDC2 each represent a generally-used booster circuit. The circuit DCDC1 includes coils L2 and L3, a diode D2, a transistor Q10, and capacitors C2 and C3, while the circuit DCDC2 does a coil L4, a diode D3, a transistor Q11, and a capacitor C1. These booster circuits are controlled by the control IC 2b and performs a boost operation of generating voltages VCC2 for driving the respective heavy-load sections and voltage VCC4 for driving a light-load circuit using the CPU 2a and another stabilization power supply. In this embodiment, the voltage VCC4 is set to 4 V, and the voltage VCC corresponds to that shown in FIG. 1 and is set to 2 V. The control IC 2b stops the voltage from rising when the voltage becomes 2 V or higher.

The voltage VCC2 boosted by the booster circuit DCDC2 is stored in the capacitor C1. If the capacitance of the capacitor C1 is $\alpha(\mu F)$, the charges of $\alpha*V2$ (* shows a power hereinafter) can be stored in the capacitor C1. The control IC 2b controls a boost of voltage such that the voltages VCC2 and VCC4 are each always set to a predetermined one even when the boost is allowed by the CPU 2a.

In FIG. 2, B1 denotes a lens driving motor, B2 a film wind/rewind driving motor (hereinafter referred to as a film feeding motor), Q3 to Q8 transistors for controlling the motors B1 and B2, L1 a shutter driving plunger, Q9 a plunger control transistor, and 3 an IRED. These correspond to the driving circuits of the heavy-load sections 6, 7, . . . illustrated in FIG. 1. The driving circuits are connected in parallel to their common power supply line 13, and the voltage of the line 13 is set to VCC3.

The transistors Q3 to Q8 are controlled by terminals M1 to M6 of the CPU 2a. The lens driving motor B1 take off the lens when it rotates forward and take in (resets) the lens when it rotates backward, while the film feeding motor B2 feeds a one-exposure film when it rotates forward and rewinds a film when it rotates backward.

If an adequate voltage and an adequate current are supplied to the power supply line 13 (=VCC3), the transistors Q3 and Q6 are turned on, and the transistors Q4 and Q5 are turned off, then the lens driving motor B1 rotates forward. If the transistors Q4 and Q5 are turned on and the transistors Q3 and Q6 are turned off, the motor B1 rotates backward. If the transistors Q3 and Q4 are turned off and the transistors Q5 and Q6 are turned on, the motor B1 is braked. If all the transistors Q3 to Q6 are turned off, the motor B1 is turned off.

Similarly, if an adequate voltage and an adequate current are supplied to the power supply line 13 (=VCC3), the transistors Q4 and Q8 are turned on, and the transistors Q6 and Q7 are turned off, then the film feeding motor B2 rotates forward. If the transistors Q6 and Q7 are turned on and the transistors Q4 and Q8 are turned off, the motor B2 rotates backward. If the transistors Q4 and Q7 are turned off and the transistors Q6 and Q8 are turned on, the motor B2 is braked. If all the transistors Q4 to Q8 are turned off, the motor B2 is turned off.

The transistor Q9 is a plunger driving transistor and its condition is controlled by the CPU 2a. If an adequate voltage and an adequate current are supplied to the power supply line 13 and the transistor Q9 is turned on, the plunger is adsorbed and the shutter is opened. On the other hand, if the transistor Q9 is turned off, the plunger is not adsorbed and the shutter is closed.

The IRED 3 emits infrared light to a subject for range-finding using triangulation. This light emission is controlled by the CPU 2a through the control IC 2b.

An IRED terminal of the control IC 2b is connected to the IRED 3 on its cathode side and has a constant current sink circuit. When a current of I(A) is sunk through the IRED terminal of the control IC 2b, the IRED 3 emits infrared light on condition that an adequate voltage is applied to the power supply line 13 (=VCC3).

The infrared light so emitted is projected on the subject through a projection lens (not shown) of the camera, and the light reflected by the subject is incident upon a light-receiving sensor (not shown) through a light-receiving lens (not shown) of the camera. A photoelectric current generated by the incident light is integrated, and time required for inversely integrating the integrated current by a constant current is measured, with the result that the range-finding of the subject is performed based on the measured time.

The transistors Q1 and Q2 are switching transistors corresponding to the switching section 5 of FIG. 1 and controlled by the CPU 2a. The emitter of the transistor Q1 is connected to the line 11 (VCC1), the collector thereof is connected to the line 13 (VCC3), and the base thereof is connected to a terminal VSW1 of the CPU 2a via a resistor. The emitter of the transistor Q2 is connected to the line 12 (VCC2), the collector thereof is connected to the line 13 (VCC3), and the base thereof is connected to a terminal VSW2 of the CPU 2a. When the terminal VWS1 is at a low level and the VWS2 is at a high level, the voltage VCC1 is applied to the power supply line 13. When the terminal VSW2 is at a low level and the terminal VSW1 is at a high level, the voltage VCC2 is applied to the line 13.

The power supply lines 11 and 12 are connected to the CPU 2a and control IC 2b, respectively, and their voltages are monitored by terminals VCC1IN and VCC2IN of the CPU 2a and control IC 2b. In this embodiment, the voltage of the line 11 (VCC1) is divided by resistors R1 and R2 and the divided voltage is monitored by the CPU 2a. The control IC 2b detects whether the voltage of the line 12 (VCC2) is higher than a threshold voltage V2. The resistors R1 and R2 correspond to the detecting section 4 shown in FIG. 1. The threshold voltage V2 can be set by a single output from the CPU 2a. Since, actually, the threshold voltage V2 is higher than the power supply voltage of the control IC 2b, a voltage of ⅕*VCC2, which is obtained by dividing the voltage (VCC2) of the line 12 by resistors, is compared with a threshold voltage ⅕*V2 in the control IC 2b, and the result of the comparison is sent to the CPU 2a.

In the embodiment of the present invention, at least the IRED is driven and the motors and plunger are started using voltage VCC2 and, in this case, since the voltage for driving the IRED is higher than that for starting the motors and plunger, the set voltage V2 has to satisfy at least the following formula in order to emit light from the IRED:

$$V2 \geq VF+VI+VQ \qquad (1)$$

Though a detailed description of the voltage of the IRED terminal of the control IC 2b is omitted, VI of the formula (1) represents a voltage of the IRED terminal when a constant current of I(A) is sunk through the terminal IRED, and 0.6 V is required at the minimum as the voltage of the IRED terminal. In the formula (1), VF is a voltage (about 2.5 V) at both ends of the IRED when the constant current of I(A) flows through the IRED and the voltage is substantially constant, and VQ is a charging voltage dropped when the constant current flows through the IRED for range-finding in one shutter sequence and satisfies the following formula:

$$VQ \geq I*T/\alpha \qquad (2)$$

where I is a constant current flowing through the IRED, α is a capacitance of the capacitor C1, and T is time during which the constant current is flowing through the IRED in one shutter sequence. Assuming that I=1[A], the number of emissions is 64, the time for one emission is 80 μS, and the capacitance of the capacitor C1 is 2200 μF, VQ is expressed as follows:

$$VQ \geq I*T/\alpha = 2.33 \text{ V}$$

The requisite voltage V2 is thus given by the following formula:

$$V2 \geq VF+VI+VQ = 5.43 \text{ V}$$

The relationship between voltages VCC1 and VCC2 and voltages necessary for the respective heavy-load circuits, will be described later with reference to FIGS. 3 and 4.

An operation of the power supply unit of the above embodiment will now be described with reference to the flowcharts of FIGS. 5 to 11 and the time chart of FIG. 12.

FIG. 5 is the main flowchart for explaining the operation of the power supply unit.

When an operator turns on a power switch of a camera, the CPU 2a initializes the unit (step S1) and allows the control IC 2b to be boosted (step S2). The CPU 2a outputs low- and high-level signals from terminals VSW1 and VSW2, respectively by the initialization, and the voltage VCC1 is applied to the power supply line 13 (VCC3). The control IC 2b starts to be boosted and operated such that the power supply lines 12 (VCC2) and 14 (VCC4) are set to voltages V2 and V4, respectively, and the voltages V2 and V4 are held in the lines 12 and 14.

The CPU 2a determines whether a release switch SW of the camera is depressed or not (step S3). If the switch SW is depressed, the flow goes to step S4 to start the shutter sequence. If not, the operation of step S3 is repeated.

The CPU 2a executes a subroutine of "voltage detection" (FIG. 6) to check the battery and detect the voltages VCC1 and VCC2 (step S4), executes a subroutine of "range-finding" (FIG. 7) to emit light from the autofocus IRED and perform range-finding (step S5), and measures the intensity of the light on the subject. The CPU 2a executes a subroutine of "lens driving" (FIG. 8) to drive a photographic lens based on the measured intensity (step S7), and then executes a subroutine of "exposure control" (FIG. 9) to control exposure based on the measured light intensity (step S8).

Through the above steps, an image pickup for a one-exposure film is completed. A subroutine of "lens reset" (FIG. 10) is executed to return the lens to a reset position (step S9), a subroutine of "one-exposure film feed" (FIG. 11) is executed to feed a one-exposure film (step S10), and a processing for completing the shutter sequence is executed (step S11). The shutter sequence ends accordingly.

Figure 6:
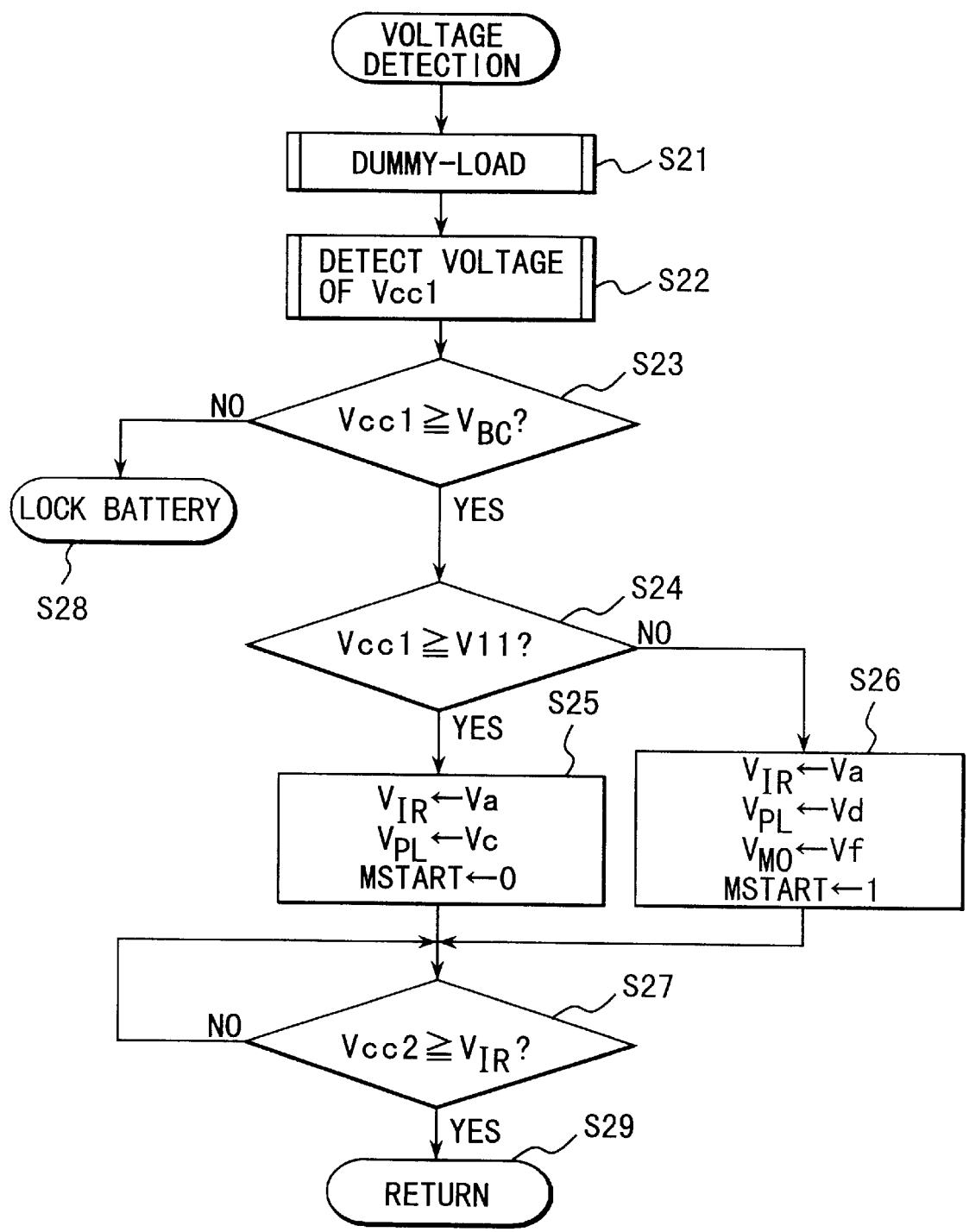
FIG. 6 is a flowchart showing a sequence of a subroutine of "voltage detection"

An operation of each of the above subroutines will be described with reference to the flowcharts shown in FIGS. 6. to 11.

Referring to the flowchart of FIG. 6, the subroutine of "voltage detection" will be described. In this subroutine, voltages VCC1 and VCC2 are detected to set a sequence for switching a voltage to be applied to the power supply line 13 (VCC3) when the battery is checked and the motors, IRED and plunger are driven.

A discharge current (about 500 mA in this embodiment) is dummy-loaded in the power line (VCC1) through a terminal of the control IC 2b (step S21) and then the voltage VCC1 is detected by AD-conversion (step S22). The CPU 2a checks the battery (step S23). If VCC1 ≥ VBC, the shutter sequence is continued. If VCC1<VBC, the shutter sequence is completed and the battery is locked, which are displayed to inform an operator thereof (step S28).

The above VBC indicates a battery lock voltage (about 0.9 V) preset in the camera of the present invention. If VCC1 ≥ VBC in step S23, the CPU 2a determines whether the voltage VCC1 is high enough to start the actuator (step S24).

The relationship between voltages VCC1 and VCC2 and voltages necessary for the respective heavy-load circuits, will be described with reference to FIGS. 3 and 4. In this embodiment, a power supply battery is capable of starting the motors and plunger when it is a brand-new one; however, if the battery is consumed and its voltage is lowered, neither the plunger nor the motors can be started. The power supply voltage necessary for starting the motors and plunger and the power supply voltage VCC1 necessary for driving them are set as shown in FIG. 3.

Figure 3:
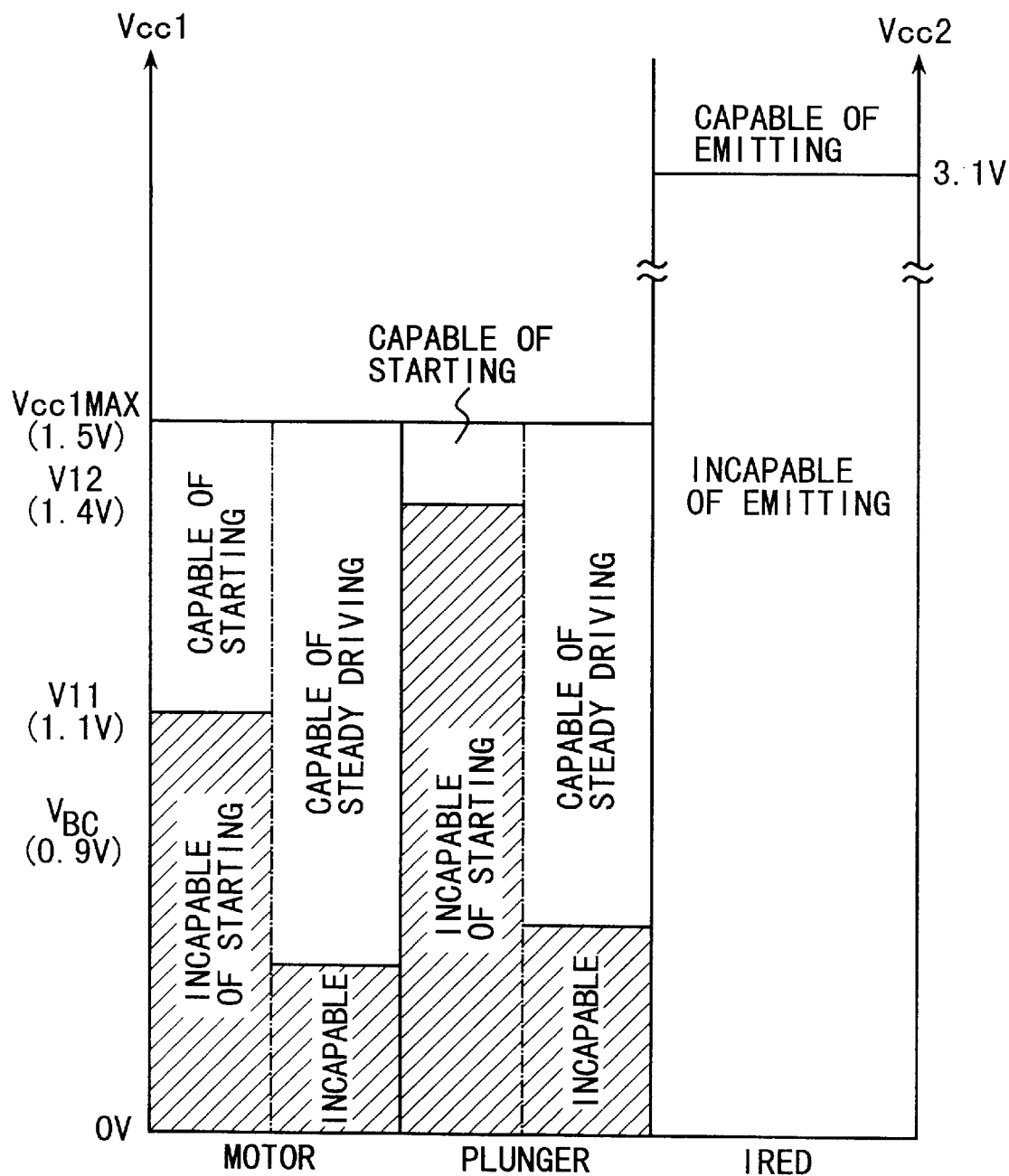
FIG. 3 is a view showing a relationship between voltages VCC1 and VCC2 and voltages required for respective heavy-load circuits.

In FIG. 3, VCC1MAX represents the highest voltage of the battery in the embodiment of the present invention and, as described above, it is about 1.5 V when the battery is of AA-size.

As is apparent from FIG. 3, both the motors and plunger can be started at VCC1 when CC1 ≥ V12, the motors can be started but the plunger cannot be done at VCC1 when V12>VCC1 ≥ V11, and neither the motors nor the plunger can be started at VCC1 when VBC ≤ VCC1<V11.

It is also apparent from FIG. 3 that the IRED cannot emit light even at the voltage of VCC1MAX and a voltage of 3.1 V or higher is required to emit light from the IRED. The IRED is therefore driven at VCC2, too, which will be described later.

If VCC1 ≥ V11, only the start of the plunger is performed at VCC2 and its subsequent steady driving is done at VCC1, and the motors is started and driven at VCC1. If VBC ≤ VCC1<V11, both the plunger and motors are started at VCC2 and their subsequent steady driving is performed at VCC1. If VCC1 ≥ V12, both the motors and plunger can be started at VCC1. Since, however, V12 is about 1.4 V and the width of voltage in VCC1MAX>VCC1 ≥ V12 is small, the plunger is started at VCC2 even though VCC1 ≥ V12.

If VCC1 ≥ V11 in step S24, VIR=Va, VPL=Vc and flag MSTART=0 (step S25). If VBC ≤ VCC1<V11, VIR=Va, VPL=Vd, VMO=Vf, and flag MSTART=1 (step S26). VIR is a threshold voltage for determining whether voltage VCC2 is boosted to such an extent that the IRED can emit light k times (64 times in this embodiment), and it is used to check the voltage of VCC2 in the next step.

Figure 4:
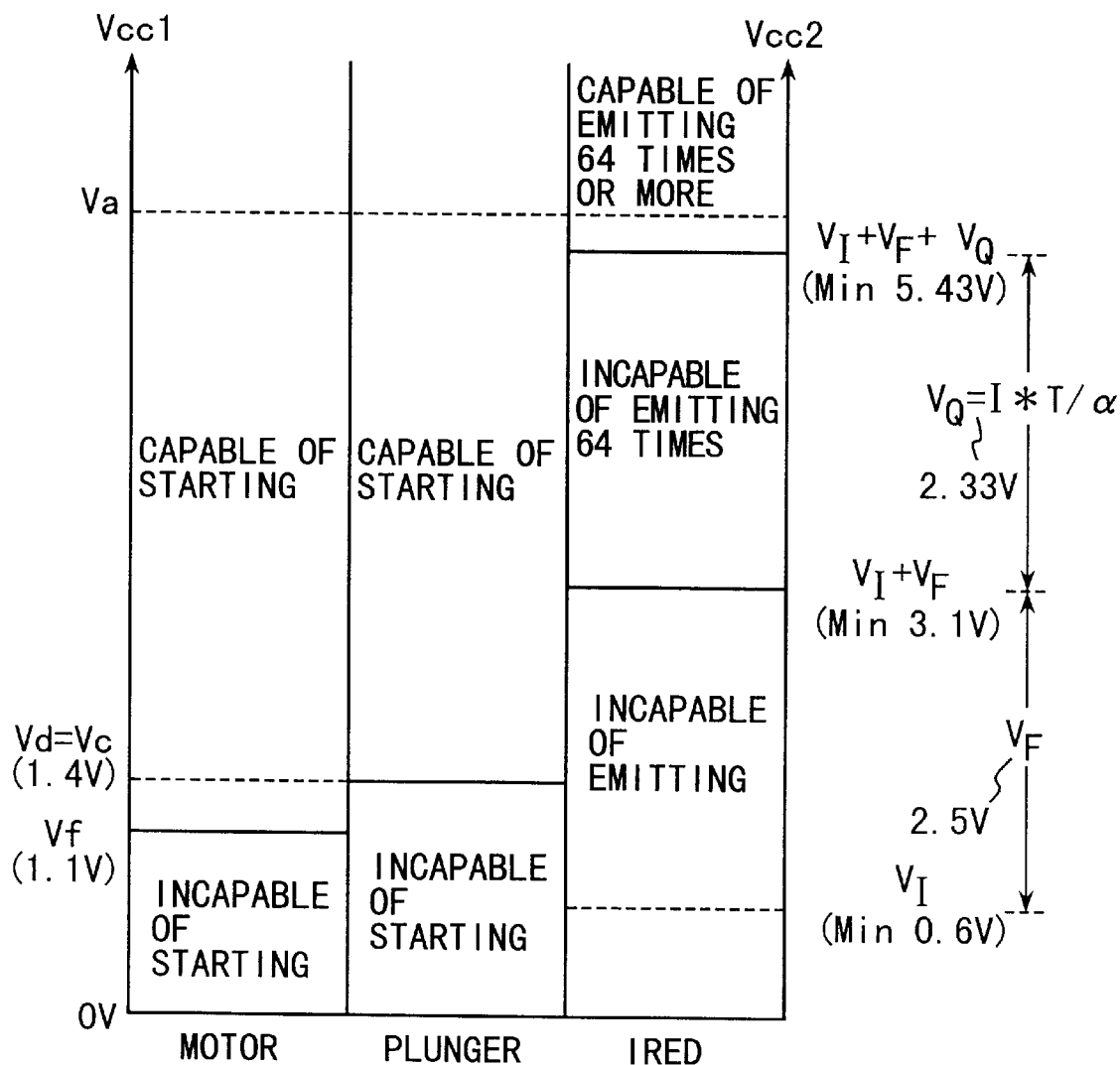
FIG. 4 is a view showing a relationship between voltages VCC1 and VCC2 and voltages required for respective heavy-load circuits.

Va indicates a voltage (Va ≥ VI+VF+VQ) as shown in FIG. 4 and it is about 5.43 V in the foregoing example. If VCC2 ≥ Va, VCC2 is a voltage capable of driving the IRED k times. As illustrated in FIG. 4, assuming that the voltage at the IRED terminal when a constant current of I(A) sinks into the control IC 2b through the terminal IRED is VI and the voltage at both ends of the IRED when the constant current of I(A) flows through the IRED is VF, VI+VF (=3.1 V) is considerably higher than V11 (=1.1 V) which is a VCC1 voltage required at the minimum for starting the motors, so that when VCC2 ≥ Va, the voltage (Va−VQ) after the IRED emits light satisfies the following:

$$Va-VQ \geq Vl+VF \geq V11.$$

If, therefore, VCC2≧Va before the IRED emits light, the motors can be started at the voltage VCC2 without re-boosting or recharging the voltage VCC2 after the emission of the IRED. In other words, if the voltage Va is stored in the capacitor C1, VCC2≧Vf even after the IRED is driven at VCC2, and the lens driving motor can be started after the IRED is driven.

Figure 12:
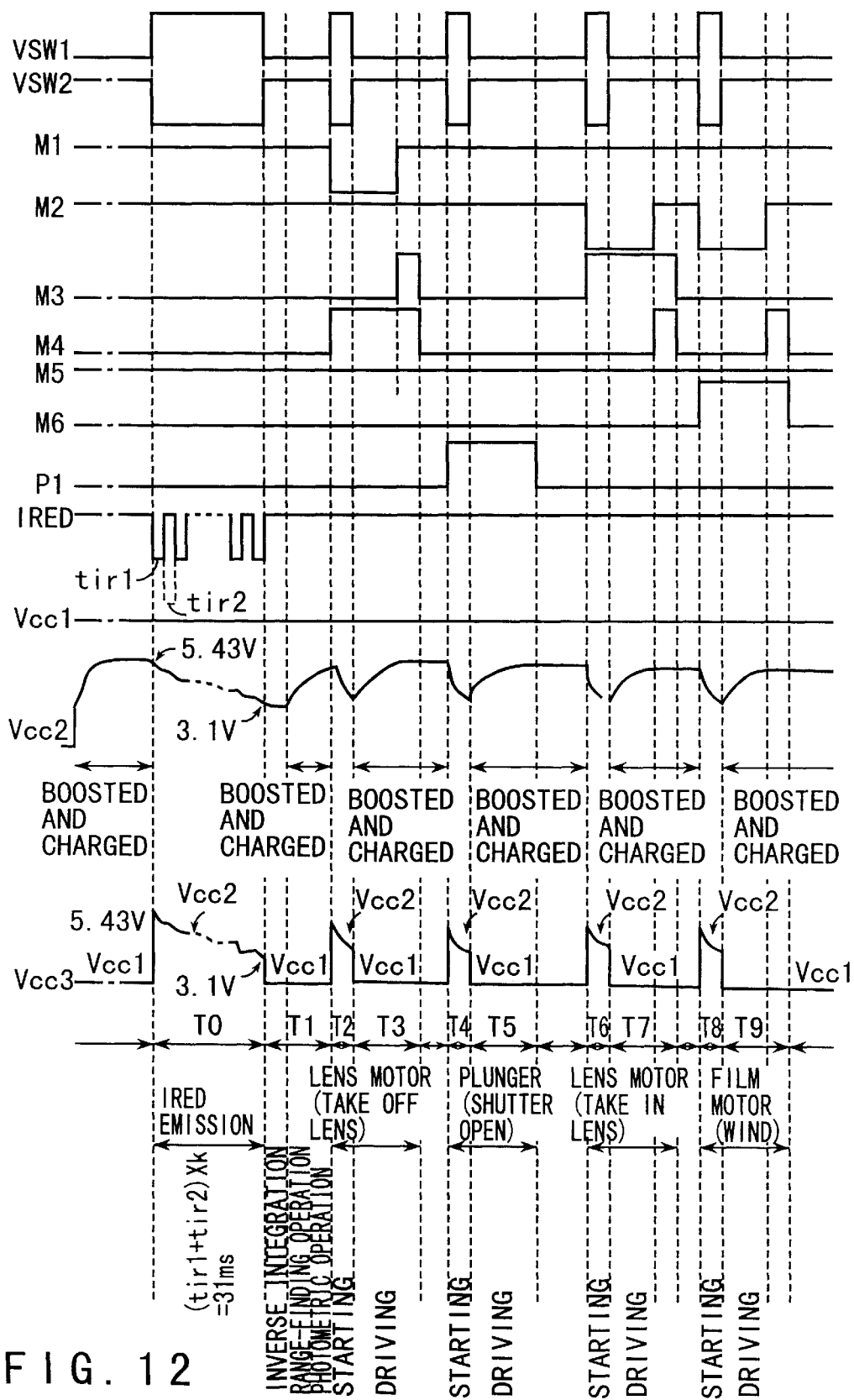
FIG. 12 is a time chart showing an operation of the power supply unit of FIG. 1.

The above operation corresponds to that performed during a period of time T2 of the time chart shown in FIG. 12. The motor is started at a voltage (=3.1 V) of VCC2. As during a period of time T1 of the time chart, the lens driving motor can be started after VCC2 is re-boosted and recharged. Since, however, T1 includes a time period during which a reverse integration is performed for range-finding, the voltage has to be re-boosted and recharged after the time period.

In time period T3 of the time chart, the motor is driven in a steady manner at VCC1, and VCC2 is re-boosted and recharged. The flag MSTART is a flag indicating whether the motor is started at VCC1 or VCC2. If flag MSTART=0, the motor is started at VCC1. If flag MSTART=1, the motor is difficult to start at VCC1 since VCC1≦V11; thus it is started at VCC2.

VPL indicates a threshold voltage for determining whether VCC2 is boosted to a usable voltage when the plunger is started, and it is used in the subroutine of "exposure control." Vd and Vc are voltages of VCC2 necessary for starting the plunger and do not vary with that of VCC1 and thus Vc=Vd. If, however, VCC2 greatly depends upon VCC1, the threshold voltage VPL can be varied with the voltage of VCC1.

The voltages Vc and Vd are shown in FIG. 4. If VCC2≧Vc and VCC2≧Vd, the plunger can be started at VCC2. VM0 denotes a voltage of VCC2 necessary for starting the lens driving motor B1 and film feeding motor B2 when the lens is reset, and it is set only on condition that VCC1<V11 which allows the film feeding motor B2 to be started at VCC2. Vf is a voltage at which the motor can be started if VCC2≧Vf as illustrated in FIG. 4.

In step S27, the control IC 2b checks the voltage of VCC2. If VCC2≧VIR, the flow returns to the main routine (step S29). If VCC2≦VIR, the flow waits until VCC2≧VIR and meanwhile VCC2 is boosted and charged.

The subroutine of "range-finding" will now be described with reference to the flowchart of FIG. 7.

This subroutine is intended to determine the distance of a subject from a camera to bring the subject into focus. Infrared light is projected on the subject, a photoelectric current generated by light, which is reflected by the subject and incident upon a light-receiving sensor (not shown), is integrated, and time required for inversely integrating the integrated current by a constant current is measured, with the result that the distance of the subject is determined based on the measured time.

More specifically, the CPU 2a sets the number k of emissions (step S31) and outputs a low-level signal from terminal VSW2 and a high-level signal from terminal VSW1 such that the power supply line 13 is supplied with VCC2 (step S32). Since the voltage of VCC2 is checked in the subroutine of "voltage detection", VCC2≧VIR.

Subsequently, the constant current of I(A) sinks into the control IC 2b through the terminal IRED for a period of time tir1($\mu$s) (steps S33 and S34). In the embodiment, tir1 is 80 $\mu$s. The IRED thus emits light for tir1($\mu$s), and infrared light is projected on the subject. Here tir1($\mu$s) is a preset time period for one emission. The reflected light of the infrared light projected on the subject is received by the sensor, and the photoelectric current is integrated.

After that, the IRED terminal of the control IC 2b is opened for a period of time tir2($\mu$s) to prevent the current from sinking therethrough and prevent the IRED from emitting light (steps S35 and S36). In this embodiment, tir2 is 400 $\mu$s. The number of emissions is decreased by one (step S37), and it is determined whether the number of emission becomes zero or not (step S38). If the number is not zero, the flow returns to step S33, in which the processing of steps S33 to S37 is repeated.

By executing the processing of above steps S31 to S38, the emission of the IRED during the time period tir1($\mu$s) is performed k times at intervals of tir2($\mu$s). The voltage lost from VCC2 by the emission of the IRED is:

$$VQ=I/\alpha*(tir1*k)$$

The charging voltage of the capacitor C1 is decreased by VQ(V). When the charging voltage is Va, if a boosted voltage is eliminated, the voltage VCC2 is given as follows:

$$VCC2=Va-VQ$$

This operation corresponds to that performed during a time period T0 of the time chart shown in FIG. 12, and VCC drops from 5.43 V to 3.1 V.

The emission and integration are completed, a low-level signal is output from VSW1 and a high-level signal is output from VSW2, and the power supply line 13 is supplied with VCC1 (step S39). The voltage obtained by integrating the photoelectric current is inversely integrated by causing the constant current to sink to measure time tAF required for reaching a reference voltage VAF and determine the distance of the subject by the time tAF (steps S41 to S48). In order to remove an influence of noise due to DCDC, the control IC 2b stops the DCDC2 from performing a boost operation (step S40). Since the transistor Q2 is turned off, the voltage (VCC2=Va−VQ) of the power supply line 12 is held.

After the range-finding operation, the control IC 2b allows the DCDC2 to be boosted (step S47). Since VCC2≦V2, the DCDC2 starts to be boosted and the range-finding subroutine is completed. In this subroutine, a photometric sensor (not shown) performs an operation of measuring the luminance of a subject to determine an exposure value and plunger driving time tp1. In the embodiment, tp1 is 5 ms for example.

Figure 8:
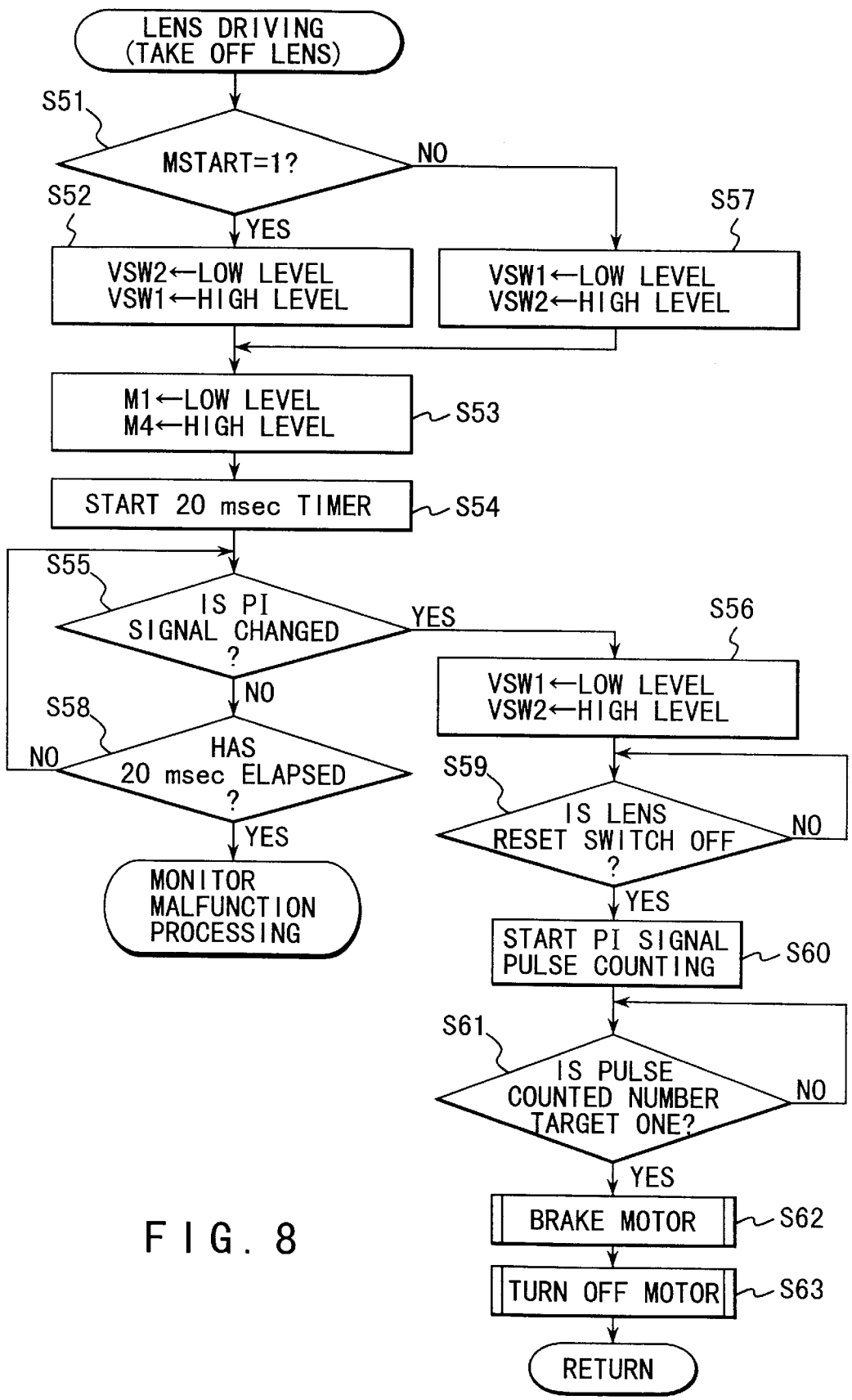
FIG. 8 is a flowchart showing a sequence of a subroutine of "lens driving"

Referring now to the flowchart of FIG. 8, the subroutine of "lens driving" will be described. This routine is intended to move the lens to a position determined based on the result of the range-finding. An operator moves the lens to the target position while monitoring the lens position through the photo-interrupter PI1 shown in FIG. 2. It is the lens driving motor B1 that drives the lens. The motor B1 is driven when the CPU 2a controls the outputs of terminals M1 to M6 and does the conditions of the motor B1 which is rotated forward, rotated backward, braked, turned off, and the like. In other words, the CPU 2a starts the motor B1 (steps S51 to S59).

If VCC1≧V11, the lens driving motor B1 is started at VCC1. If VBC≦VCC1≦V11, the motor B1 is started at VCC2. Concretely, when the flag MSTART set in the voltage detection subroutine is 0 (VCC1≧V11), the motor B1 is started at VCC1 and, when the flag MSTART is 1 (VBC≦VCC1≦V11), the motor B1 is started at VCC2.

More specifically, the CPU 2a first determines whether the flag MSTART is 1 or not (step S51). The lens driving when the flag MSTART is 1 will now be described. The lens driving motor B1 is started at VCC2 with which the capacitor C1 is charged. Since the flag MSTART is 1, the CPU 2a outputs high- and low-level signals from VSW1 and VSW2 terminals, respectively, and applies VCC2 to the power supply line 13 (step S52).

Next, the CPU 2a outputs low- and high-level signals from terminals M1 and M4, and the motor B1 is started with the voltage stored in the capacitor C1 (step S53). The voltage VCC2 after the range-finding subroutine is given by:

$$VCC2 = Va - VQ$$

Since the threshold voltage V2 is boosted so as to satisfy the following:

$$Va \geq VF + VI + VQ$$

the voltage VCC2 is expressed as follows:

$$VCC2 \geq VF + VI$$

As is apparent from FIG. 4, the voltage VCC2 is higher than the voltage required for starting the lens driving motor B1 and then continues to be started. It is thus unnecessary to check whether VCC2 is boosted to a voltage enough to start the motor.

In the above formulae, VI is a voltage at the IRED terminal through which the constant current I(A) sinks into the control IC2, VF is a voltage at both ends of the IRED through which the constant current I(A) flows, and VQ is a voltage satisfying the equation, $$VQ = I/\alpha*(tir1*k).$$

The CPU 2a starts a limit timer (time limit=20 msec) for monitoring a malfunction (step S54) and monitors a motor PI to check whether a PI signal is changed or not (step S55). When the PI signal is changed, the lens driving motor B1 has started to operate. The CPU 2a is so operated that low- and high-level signals are output from terminals VSW1 and VSW2, respectively, and VCC1 is applied to the power supply line 13 (step S56). The motor B1 is thus driven at VCC1. Since, then, the voltage VCC2 is used to start the motor B1, VCC2≦V2 and the control IC2b starts to boost the voltage VCC2. Though VCC1 is lower than the voltage (VCC2) at which the motor B1 is started, the motor B1 operates without any trouble since the initial driving (starting) of the motor B1, which requires a high load, has been finished.

Since the lens driving motor B1 has been started, the flow advances to the driving sequence. When VCC1 is high, the motor B1 can be started and driven only at VCC1. If flag MSTART is 0 in step S51, the motor B1 is started at VCC1. When flag MSTART is 0, the CPU 2a is so operated that low- and high-level signals are output from terminals VSW1 and VSW2, respectively (step S57) and voltage VCC1 is applied to the power supply line 13 (=VCC3). As in the case where flag MSTART is 1, the CPU 2a monitors the motor PI to check whether the PI signal is changed or not (step S55). When the PI signal is changed, the motor B1 has started to operate. The flow thus goes to the driving sequence (step S56).

If, in step S55, the PI signal does not change in 20 ms, the flow advances to a malfunction monitoring sequence to execute a malfunction monitoring processing (step S58). Since time required for starting the lens driving motor B1 is several milliseconds, it is determined that a malfunction occurs if the motor B1 is not started even in 20 ms.

Since the motor B1 has been started, the motor is driven until the lens reaches near to a target position in step S59 et seq. If a lens reset switch is monitored to confirm that the lens passes a reset position or if a lens reset switch changes from ON to OFF (step S59), the counting of pulses of the motor B1 is started based on the range-finding value obtained by the range-finding subroutine (step S60). Then, the CPU 2a monitors the motor PI and counts the pulses thereof, and drives the lens until the counted pulses reach a target number (step S61). The target number is determined by the target position of the lens which depends upon the distance of the subject calculated by the range-finding subroutine.

If the counted pulses reach the target number so determined, the CPU 2a operates so as to output a high-level signal from terminals M1 and M3 and brakes the motor B1 to stop it from being driven (step S62). After that, the CPU 2a operates so as to output a low-level signal from terminals M3 and M4 and turns off the motor B1 (step S63). The lens driving is thus finished.

The subroutine of "exposure control" will now be described with reference to the flowchart of FIG. 9. In this subroutine, a shutter time tp1(msec) and a diaphragm are determined from the result of range-finding, a plunger shutter is operated and opened for a period of the shutter time tp1.

First, the CPU 2a determines whether VCC2≧VPL (step S71). If VCC2<VPL, voltage VCC2 is boosted so as to satisfy VCC2≧VPL. As described above, in the voltage detection subroutine, VPL is set equal to Vc and Vc is set to the voltage as shown in FIG. 4; therefore, if VCC2≧VPL, the plunger can be started at voltage VCC2 with which the capacitor C1 is charged.

The CPU 2a is then operated such that high- and low-level signals are output from terminals VSW1 and VSW2, respectively, and voltage VCC2 is applied to the power supply line 13 (step S72). The CPU 2 also outputs a high-level signal from terminal P1 to adsorb the plunger (step S73). The plunger shutter is thus opened. Then the plunger is started at voltage VCC2 with which the capacitor C1 is charged. This operation corresponds to that performed during a time period T4 of the time chart of FIG. 12.

The CPU 2a starts the limit timer (time limit=20 ms)(step S74) and then monitors a shutter PI to check whether a PI signal is changed or not (step S75). When the PI signal is changed, the shutter has been opened and thus the plunger has been started. Since the starting of the plunger is completed, the CPU 2a is so operated that low- and high-level signals are output from terminals VSW1 and VSW2, respectively, and voltage VCC1 is applied to the power supply line 13 (step S77). Since the charges of VCC2 are used for starting the plunger, VCC2≧V2 and thus VCC2 starts to be re-boosted and recharged. After that, the plunger is driven at VCC 1. This operation corresponds to that performed during a time period T5 of the time chart of FIG. 12. Though VCC1 is lower than the voltage (VCC2) at which the plunger is started, the plunger operates without any trouble since the starting of the plunger, which requires a high load, has been completed.

If, in step S76, the PI signal does not change in 20 ms, the CPU 2a executes a malfunction monitoring processing in the malfunction monitoring sequence (step S76).

When the shutter is opened, a shutter timer is started (step S78) and, after a period of time tp1ms has elapsed (step S79), the CPU 2a sets terminal PI at a low level (step S80) and completes adsorbing the plunger. Thus, the plunger is closed and the exposure ends. The shutter closing processing is executed (step S81) and the exposure control subroutine is completed.

Figure 10:
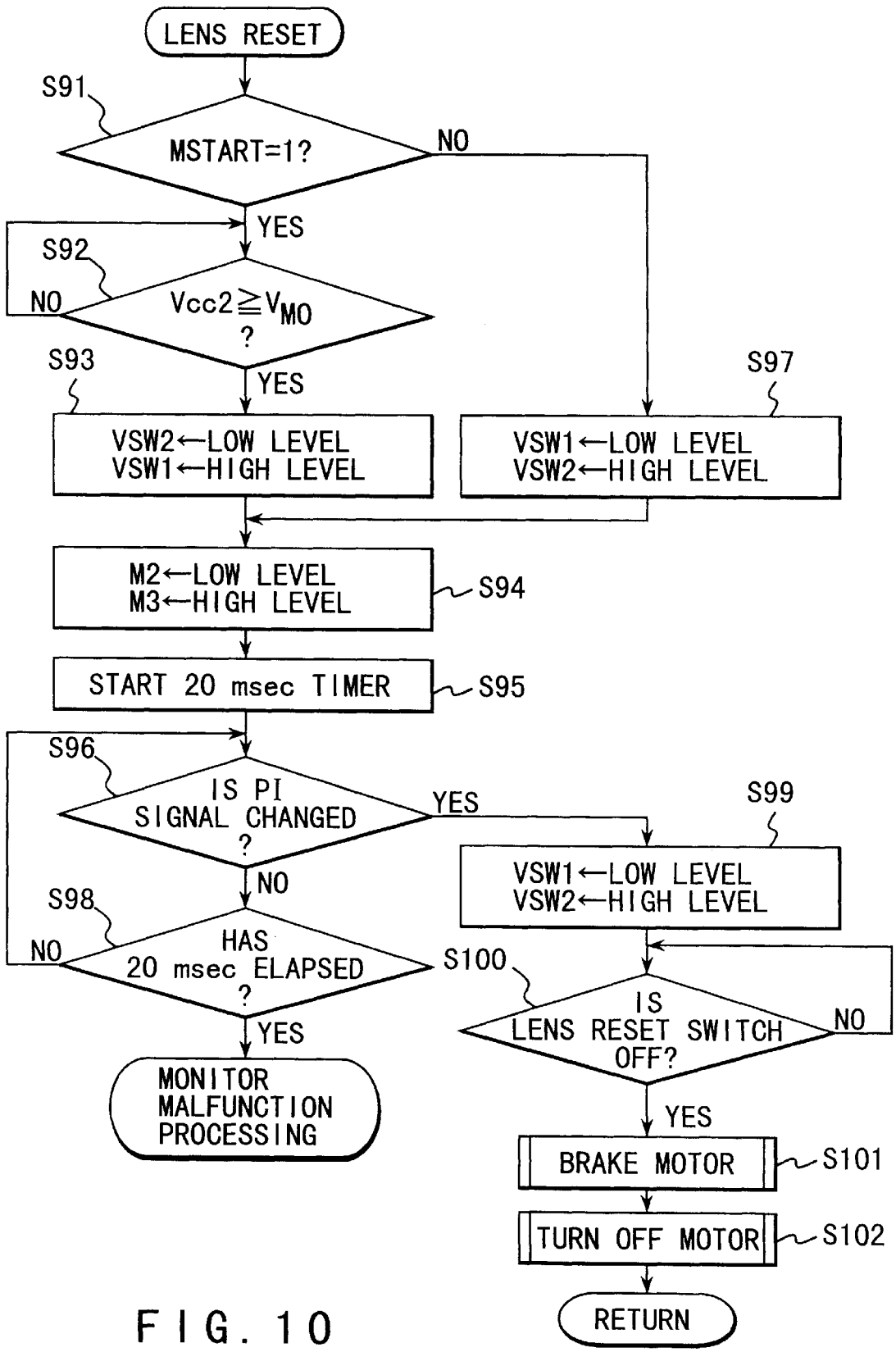
FIG. 10 is a flowchart showing a sequence of a subroutine of "lens reset"

The subroutine of "lens reset" will now be described with reference to the flowchart of FIG. 10. In this subroutine, the lens is take off (reset). As in the case where the lens is take in, the lens driving motor B1 is started at VCC1 when flag MSTART is 0 (VCC1≧V11) and it is done at VCC2 when flag MSTART is 1 (VBC≦VCC1≦V11).

The CPU 2a determines whether the flag MSTART is 1 or not (step S91). When it is 1, the lens driving motor B1 is started at VCC2 with which the capacitor C1 is charged. Since VCC2 is lowered due to plunger driving (exposure control) of the shutter, it is determined whether VCC2 is a voltage necessary for starting the motor B1 (step S92). If YES, the CPU 2a so operates that high- and low-level signals are output from terminals VSW1 and VSW2, respectively and VCC2 is applied to the power supply line 13 (=VCC3) (step S93). The CPU 2a then operates such that high- and low-level signals are output from terminals M3 and M2, respectively and the motor B1 is rotated reversely (step S94). The motor B1 is driven at voltage VCC2 with which the capacitor C1 is charged. This operation corresponds to that performed during a time period T6 of the time chart of FIG. 12.

The CPU 2a starts the limit timer (time limit=20 ms)(step S95) and then monitors the motor PI to check whether a PI signal is changed or not (step S96). When the PI signal does not change in 20 ms after the limit timer is started (step S98), the monitor determines that a malfunction occurs and the CPU 2a executes a malfunction monitoring processing.

When the PI signal is changed, the motor B1 has been started and the CPU 2a is so operated that low- and high-level signals are output from terminals VSW1 and VSW2, respectively and voltage VCC1 is applied to the power supply line 13 (=VCC3)(step S99). The motor B1 is thus driven at VCC1.

Since the charges of VCC2 are used for starting the motor B1, VCC2≧V2 and thus the control IC 2b starts boosting the voltage VCC2. This operation corresponds to that performed during a time period T7 of the time chart of FIG. 12. Though VCC1 is lower than the voltage (VCC2) at which the motor B1 is started, the motor B1 operates without any trouble since the starting of the motor, which requires a high load, has been completed. The motor B1 is therefore driven and so is the lens accordingly.

Since the motor B1 has been started, the lens is moved to a reset position by the motor B1 in step S99 et seq. More specifically, the lens reset switch is monitored and the lens is driven until the lens reaches the reset position or until the lens reset switch changes from OFF to ON (step S100).

When the lens arrives at the reset position, the CPU 2a operates so as to output a high-level signal from terminals M2 and M4 and brakes the motor B1 to stop driving the lens (step S101). After that, the CPU 2a operates so as to output a low-level signal from terminals M3 and M4 and turns off the motor B1 (step S102). The lens reset is finished. The lens reset switch is monitored to check whether it is ON or OFF (step S199). If the switch is turned on, it is determined that the lens returns to the reset position, and the motor B1 is braked to stop driving the lens (step S101). After that, both the terminals M3 and M4 are set at a low level, and the lens driving motor is turned off (step S102). When VCC1 is high, the motor B1 can be started and driven only at VCC1.

The case where it is determined in step S91 that the flag MSTART is 0, will now be described. In this case, the lens driving motor B1 is started at VCC1. The CPU 2a operates such that low- and high-level signals are output from terminals VSW1 and VSW2, respectively (step S97) and voltage VCC1 is applied to the power supply line 13 (=VCC3). As in the case where the flag MSTART is 1, the limit timer (time limit=20 msec) is started (step S95) and the motor PI is monitored to check whether a PI signal is changed or not (step S96). If it is determined that the PI signal is not changed in 20 ms after the starting of the limit timer (step S98), the monitor determines that a malfunction has occurred and the CPU 2a executes a malfunction monitoring processing.

If it is determined that the PI signal is changed (step S96), the motor B1 starts to operate, and the processing in step S99 et seq. is executed as in the case where the flag MSTART is 1.

Figure 11:
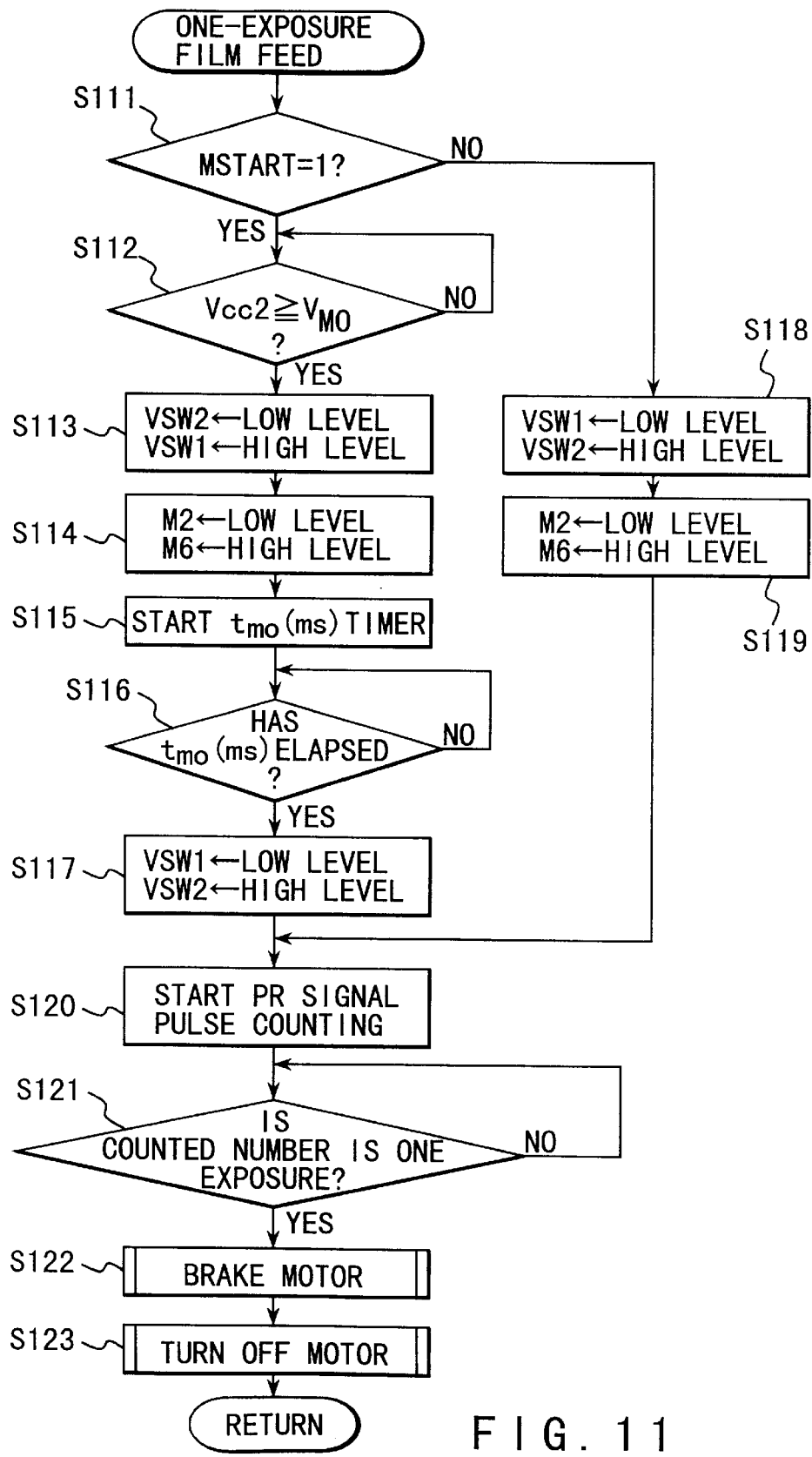
FIG. 11 is a flowchart showing a sequence of a subroutine of "one-exposure film feed"

Referring to the flowchart of FIG. 11, the subroutine of "one-exposure film feed" will now be described. Like in the lens driving subroutine, when the flag MSTART is 0 (VCC1≧V11), the film feeding motor B2 is started at VCC1 and, when the flag MSTART is 1 (VBC≦VCC1≦V11), the motor B2 is started at VCC2.

First the CPU 2a determines whether the flag MSTART is 1 or not (step S111). When the flag MSTART is 1, the motor B2 is started at VCC2 with which the capacitor C1 is charged. Since VCC2 is lowered due to the driving of the lens driving motor B1, it is determined whether VCC2 is a voltage necessary for starting the motor B2 (step S112). If YES, the CPU 2a so operates such that high- and low-level signals are output from terminals VSW1 and VSW2, respectively and VCC2 is applied to the power supply line 13 (=VCC3) (step S113).

The CPU 2a then operates such that high- and low-level signals are output from terminals M6 and M2, respectively and the motor B2 is rotated forward (step S114). The motor B1 is started at voltage VCC2 with which the capacitor C1 is charged. This operation corresponds to that performed during a time period T8 of the time chart of FIG. 12.

The CPU 2a starts a tmo (msec) timer (step S115) and determines whether tmo (msec) has elapsed or not (step S116). If tmo has elapsed, the CPU 2a operates such that high- and low-level signals are output from terminals VSW2 and VSW1, respectively and VCC1 is applied to the power supply line 13 (=VCC3) (step S117). This operation corresponds to that performed during a time period T9 of the time chart of FIG. 12.

Since tmo is set in the voltage detection subroutine such that there is enough time to start the motor B2 and VCC2 is equal to or higher than VCC1, the voltage to be applied to the motor driving power supply voltage VCC3 is changed from VCC2 to VCC1 before the motor 2 is stopped.

Since the charges of VCC2 are used for starting the motor B2, VCC2≦V2 and thus the control IC 2b starts boosting the voltage VCC2. Though VCC1 is lower than the voltage (VCC2) at which the motor B2 is started, the motor B2 operates without any trouble since its starting requiring a high load has been completed. Thus, the flow advances to the driving sequence.

While the film feeding motor B2 is being driven, the count of PR signals for detecting perforation of films is started (step S120). The edges of variations in the PR signals are monitored and counted, and it is determined whether the counted number reaches a predetermined value (step S121). If the feed of films for one exposure is completed, the control IC2b sets terminals M2 and M4 at a high level to brake the motor B2 (step S122), and the control IC2a sets terminals M4 and M6 at a low level to turn off the motor B2 (step S123). By the above process, the one-exposure film feeding is completed. The processing for completing the shutter sequence is executed and then the shutter sequence is finished.

According to the embodiment described above, the voltage boosted and charged with the capacitor, and the power supply voltage are switched by switching elements of the transistors Q1 and Q2 and applied to the two motors, plunger and light-emitting circuit. Of the heavy-load circuits, the motor driving circuit and plunger driving circuit employ a voltage boosted only at the time of starting requiring a high load and a power supply voltage at the time of steady driving requiring a low load. Therefore, the two motors and plunger can be driven even though the power supply voltage is a low voltage incapable of driving them. Since the light-emitting circuit is charged with only the boosted voltage, it can be driven by a single battery of 1.5 V.

The motor driving circuit and plunger driving circuit are charged with the boosted power supply voltage even while the heavy-load circuits are being driven. Thus, the heavy-load circuits can be driven in a short time and continue to operate.

When the power supply voltage is high, the sequence is changed such that the motor is started not at the boosted voltage but at the power supply voltage. The boosted voltage is reduced in use and the power supply is economized.

The present invention is not limited to the forgoing embodiments. Various changes and modifications can be made without departing from the scope of the subject matter of the present invention. In the above embodiment, the voltage VCC2 is compared with the set voltages in the respective subroutines and boosted to a target set voltage in the shutter sequence, and the boosted voltage is used for starting the actuator. However, for example, the actuator can be started when VCC2 is higher than the set voltage having a fixed value. Moreover, after it is confirmed whether the voltage VCC2 reaches a necessary one before the IRED emits light, the voltage VCC2 is not monitored in the shutter sequence but can be boosted for a predetermined period of time after the actuator is started at VCC2 or the IRED emits light, and the next operation can be carried out.

Figure 13:
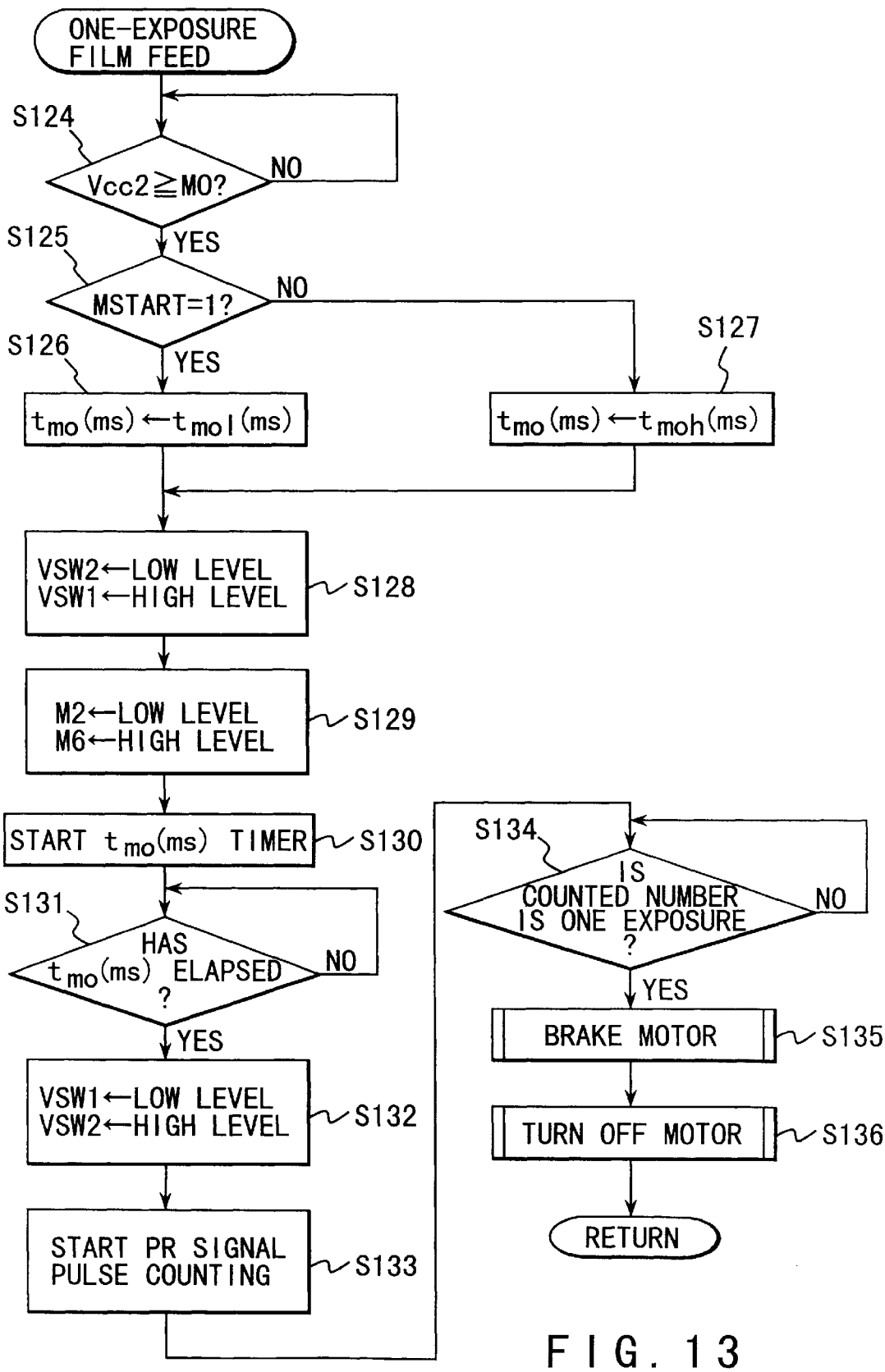
FIG. 13 is a flowchart of a sequence of a modification to the subroutine of FIG. 11.

Finally, a modification to the subroutine of "one-exposure film feed" will be described with reference to the flowchart of FIG. 13. This modification can be applied to the other subroutines such as the lens reset subroutine.

First, the CPU 2a determines whether VCC2≧VMO (step S124). If VCC2<VMO, VCC2 is lowered by driving the lens driving motor B1. The flow stands by until VCC2 is boosted to a voltage necessary for starting the motor B2.

Next, the CPU 2a determines whether the flag MSTART is 1 (step S125). When it is 1, the tmo (msec) timer is set to tmo1 (msec) (step S126). When it is 0, the tmo timer is set to tmoh (msec) (step S127). Here tmo1 and tmoh are set to necessary and sufficient time for starting the motor B2 under the respective power-supply conditions.

While tmoh is time required for starting the motor B2 when the flag MSTART is 0 (i.e., VCC1≧V11), tmo1 is time required for starting the motor B2 when the flag MSTART is 1 (i.e., VCC1<V11). Thus, tmoh is more necessary than tmo1 when the power supply voltage VCC1 is high and accordingly the following formula has to be satisfied: tmoh (msec)<tmo1 (msec).

According to the embodiment of the present invention, tmo1 is set to 1.5 msec and tmoh is set to 0.8 msec.

Since the tmo timer sets time for starting the motor B2 at the voltage VCC2 with which the capacitor C1 is charged, the time is set to tmo1 when the flag MSTART is 1 (VCC1<V11) and it is set to tmoh when the flag MSTART is 0 (VCC1≧V11).

The CPU 2a so operates that high- and low-level signals are output terminals VSW1 and VSW2, respectively and the voltage VCC2 is applied to the power supply line 13 (=VCC3) (step S128). Furthermore, the CPU 2a sets terminals M2 and M6 at low and high levels, respectively and rotates the motor B2 forward (step S129). The motor B2 is started at voltage VCC2 with which the capacitor C1 is charged. This operation corresponds to that performed during a time period T8 of the time chart of FIG. 12.

The CPU 2a starts the tmo timer (step S130) and determines whether tmo has elapsed or not (step S131). If tmo has done, the CPU 2a so operates that high- and low-level signals are output from terminals VSW2 and VSW1, respectively and the voltage VCC1 is applied to the power supply line 13 (=VCC3) (step S132). The motor B2 is thus driven at the voltage VCC1. This operation corresponds to that performed during a time period T9 of the time chart of FIG. 12.

Since the operations of steps S133 to S136 are the same as those of steps S120 to S123, their descriptions are omitted.

In the foregoing operations, the motor B2 is driven at the voltage VCC2 for the time period tmo1 when the flag MSTART is 1 (VCC1<V11) and for the time period tmoh when the flag MSTART is 0 (VCC1≧V11). After that, the motor B2 is driven at the voltage VCC1.

Since, as described above, tmo1 and tmoh are set to necessary and sufficient time for starting the motor B2 under the respective power-supply conditions, the motor B2 is started at VCC2 and before it is stopped, the voltage VCC2 is switched to the motor driving power supply voltage VCC3.

Since, furthermore, tmo1 and tmoh are each set time satisfying tmo1>tmoh, the time (tmo=tmoh) for which the motor B2 is started at VCC2 charging the capacitor C1 when VCC1 is high (flag MSTART=0), is shorter than the start time (tmo=tmo1) when VCC1 is low (flag MSTART=1). Therefore, the charges of the capacitor C1 can be economized.

As has been described in detail, the present invention provides a power supply unit of a camera which efficiently drives a heavy-load system even when a power supply voltage is low and thus drives a heavy-load circuit in a short time in the photographing sequence of the camera without any trouble and which is simple in constitution and advantageous in mounting.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

We claim:

1. A power supply unit of a camera for selectively applying a power supply voltage to a plurality of load circuits, comprising:

DC power supply voltage boosting means having a capacitor, for boosting a DC power supply voltage and charging the capacitor with a boosted voltage;

switching means which receives both an output voltage of said DC power supply voltage boosting means and the DC power supply voltage and selectively outputs one of the output voltage and the DC power supply voltage to the plurality of load circuits; and control means for controlling operations of said switching means and said DC power supply voltage boosting means, the operation of said switching means being controlled in accordance with an operating condition of the plurality of load circuits.

2. The power supply unit according to claim 1, wherein said control means controls said switching means such that said switching means outputs the output voltage of said DC power supply voltage boosting means at least in an early stage of a period of time during which the power supply voltage is being applied to the plurality of load circuits.

3. The power supply unit according to claim 1, wherein said control means controls said DC power supply voltage boosting means such that the DC power supply voltage is boosted while the DC power supply voltage is being applied to the plurality of load circuits.

4. The power supply unit according to claim 1, wherein said switching means includes a plurality of transistors and selectively outputs one of the output voltage of said DC power supply voltage boosting means and the DC power supply voltage by the plurality of transistors.

5. The power supply unit according to claim 1, wherein said control means controls the operation of said switching means interlockingly with a start of each of the plurality of load circuits to be driven in sequence.

6. The power supply unit according to claim 1, wherein said plurality of load circuits include at least one actuator driving section and at least one light emitting section for generating light with which a subject is irradiated.

7. The power supply unit according to claim 6, wherein said switching means selectively applies one of the output voltage of said DC power supply voltage boosting means and the DC power supply voltage to the actuator driving section while the actuator driving section is being driven, and applies the output voltage of said DC power supply voltage boosting means to the light emitting section while the light emitting section is being driven.

8. A power supply unit of a camera for selectively applying a power supply voltage to a plurality of load circuits, comprising:
   a DC power supply voltage boosting circuit having a capacitor, for boosting a DC power supply voltage and charging the capacitor with a boosted voltage;
   a switching circuit which receives both an output voltage of said DC power supply voltage boosting means and the DC power supply voltage and selectively outputs one of the output voltage and the DC power supply voltage to the plurality of load circuits;
   a voltage detection circuit for detecting the DC power supply voltage and the output voltage of said DC power supply voltage boosting means; and
   a control circuit for controlling an operation of said switching circuit in response to an output signal of said voltage detection circuit.

9. The power supply unit according to claim 8, wherein said control circuit controls said switching circuit such that said switching circuit outputs the output voltage of said DC power supply voltage boosting circuit at least in an early stage of a period of time during which the power supply voltage is applied to the plurality of load circuits.

10. The power supply unit according to claim 8, wherein said control circuit controls said DC power supply voltage boosting circuit such that the DC power supply voltage is boosted while the DC power supply voltage is being applied to the plurality of load circuits.

11. The power supply unit according to claim 8, wherein said switching circuit includes a plurality of transistors and selectively outputs one of the output voltage of said DC power supply voltage boosting circuit and the DC power supply voltage by the plurality of transistors.

12. The power supply unit according to claim 8, wherein said control circuit controls the operation of said switching circuit in accordance with an operating condition of the plurality of load circuits.

13. The power supply unit according to claim 8, wherein said control circuit controls said switching circuit such that the output voltage of said DC power supply boosting circuit, detected by said voltage detection circuit, is output after the output voltage satisfies a starting condition capable of starting the plurality of load circuits.

14. The power supply unit according to claim 13, wherein said starting condition is that the output voltage of said DC power supply boosting circuit exceeds a predetermined threshold voltage.

15. The power supply unit according to claim 8, wherein said control circuit controls said switching circuit such that the DC power supply voltage detected by said voltage detection circuit is output when the DC power supply voltage satisfies a starting condition capable of starting the plurality of load circuits.

16. The power supply unit according to claim 15, wherein said starting condition is that the output voltage of said DC power supply boosting circuit exceeds a predetermined threshold voltage.

17. The power supply unit according to claim 8, wherein said control circuit controls the operation of said switching circuit interlockingly with a start of each of the plurality of load circuits to be driven in sequence.

18. The power supply unit according to claim 8, wherein said plurality of load circuits include at least one actuator driving section and at least one light emitting section for generating light with which a subject is irradiated.

19. The power supply unit according to claim 18, wherein said switching circuit selectively applies one of the output voltage of said DC power supply voltage boosting circuit and the DC power supply voltage to the actuator driving section while the actuator driving section is being driven, and applies the output voltage of said DC power supply voltage boosting circuit to the light emitting section while the light emitting section is being driven.

20. An electric circuit of a camera comprising:
   a charging section for boosting a power supply voltage and charging a capacitor with a boosted power supply voltage; and
   a switching section for selectively applying the power supply voltage and an output voltage of said charging section to a plurality of load circuits.

21. The electric circuit according to claim 20, wherein said plurality of load circuits include at least one actuator driving section and at least one light emitting section for generating light with which a subject is irradiated.

22. The power supply unit according to claim 20, wherein said switching section selectively applies one of the output voltage of said charging section and the power supply voltage to an actuator driving section while the actuator driving section is being driven, and applies the output voltage of said charging section to a light emitting section while the light emitting section is being driven.

23. An electric circuit of a camera comprising:
   a charging section having a capacitor, for boosting a power supply voltage and charging the capacitor with a boosted power supply voltage;
   an actuator driving section for driving an actuator;
   a switching section for selectively applying the power supply voltage and an output voltage of said charging section to said actuator driving section;
   a detection section for detecting the power supply voltage and the output voltage of said charging section; and a control section for varying a switching sequence of said switching section based on a detection result of said detection section.

24. The electric circuit according to claim 23, wherein said control section controls said switching section such that the output voltage of said charging section is applied to said actuator driving section in an early stage of a period of time during which the actuator is being driven and the power supply voltage is applied thereto in a stage other than the early stage, and said control section changes a ratio of a time period during which the power supply voltage is applied to a time period during which the output voltage of said charging section is applied, based on the detection result of said detection section.

25. The electric circuit according to claim 23, wherein said control section changes a time period during which the actuator is being driven at the output voltage of said charging section or inhibits the actuator from being driven at the output voltage of said charging section and drives the actuator only at the power supply voltage.

26. An electric circuit of a camera comprising:
a charging section having a capacitor, for boosting a power supply voltage and charging the capacitor with a boosted power supply voltage;

an actuator driving section for driving an actuator;

a switching section for selectively applying the power supply voltage and an output voltage of said charging section to said actuator driving section; and a control section controls a switching sequence of said switching section to switch between the power supply voltage and the output voltage of said charging section when the actuator is driven and to charge said charging section with a boosted voltage when the power supply voltage is applied to said actuator driving section.

27. The electric circuit according to claim 26, wherein said control section controls said switching section such that the output voltage of said charging section is applied to said actuator driving section in an early stage of a period of time during which the actuator is being driven and the power supply voltage is applied thereto in a stage other than the early stage, and said control section charges said charging section with a boosted voltage when the power supply voltage is applied to said actuator driving section.

* * * * *